United States Patent
Glean et al.

(10) Patent No.: US 11,602,919 B2
(45) Date of Patent: Mar. 14, 2023

(54) ASYMMETRICAL LAMINATE PANEL AND METHOD OF MANUFACTURE

(71) Applicant: CertainTeed Gypsum, Inc., Malvern, PA (US)

(72) Inventors: Aldo Glean, Framingham, MA (US); Phillip Evans, Littleton, MA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 306 days.

(21) Appl. No.: 16/778,085

(22) Filed: Jan. 31, 2020

(65) Prior Publication Data
US 2020/0247091 A1     Aug. 6, 2020

Related U.S. Application Data

(60) Provisional application No. 62/799,371, filed on Jan. 31, 2019.

(51) Int. Cl.
| | |
|---|---|
| B32B 13/12 | (2006.01) |
| E04C 2/04 | (2006.01) |
| C04B 11/00 | (2006.01) |
| C04B 7/34 | (2006.01) |

(52) U.S. Cl.
CPC ............ B32B 13/12 (2013.01); C04B 7/34 (2013.01); C04B 11/00 (2013.01); E04C 2/043 (2013.01); *B32B 2307/3065* (2013.01); *B32B 2307/51* (2013.01); *B32B 2307/542* (2013.01); *B32B 2307/72* (2013.01); *B32B 2607/00* (2013.01)

(58) Field of Classification Search
CPC .. B32B 7/00–7/14; B32B 13/00–13/14; E04C 2/26; E04C 2/04; E04C 2/043
See application file for complete search history.

(56) References Cited

U.S. PATENT DOCUMENTS

| | | |
|---|---|---|
| 6,205,729 B1 | 3/2001 | Porter |
| 6,901,713 B2 | 6/2005 | Axsom |
| 7,181,891 B2 | 2/2007 | Surace et al. |

(Continued)

FOREIGN PATENT DOCUMENTS

WO   WO-2018113895 A1 * 6/2018  ............. B32B 13/04

OTHER PUBLICATIONS

Kurtze et al. "New Wall Design for High Transmission Loss or High Damping", The Journal of the Acoustical Society of America 31, (1959); pp. 739-748.*

(Continued)

*Primary Examiner* — Prashant J Khatri
(74) *Attorney, Agent, or Firm* — McDonnell Boehnen Hulbert & Berghoff LLP

(57) ABSTRACT

The present disclosure relates generally to plaster wall panels, for example, suitable for covering interior wall frames. The present disclosure relates more particularly to a plaster wall panel including a first plaster layer, a second plaster layer, and a damping layer disposed between the first and second plaster layers. The first plaster layer has a first thickness and is composed of a first plaster material that has a first material property. The second plaster layer has a second thickness and is composed of a second plaster material that has a second material property. The first thickness is smaller than the second thickness, and the first and second material properties are different.

20 Claims, 7 Drawing Sheets

(56) References Cited

U.S. PATENT DOCUMENTS

| | | |
|---|---|---|
| 8,074,766 B1 | 12/2011 | Shore et al. |
| 8,389,107 B2 | 3/2013 | Riebel et al. |
| 2008/0264721 A1 | 10/2008 | Tinianov et al. |
| 2009/0004448 A1 | 1/2009 | Tinianov |
| 2009/0280356 A1 | 11/2009 | Tinianov |
| 2010/0230206 A1* | 9/2010 | Tinianov ............... E04B 2/7409 181/290 |
| 2016/0153187 A1 | 6/2016 | Desai |
| 2016/0375655 A1 | 12/2016 | Li et al. |
| 2017/0028687 A1 | 2/2017 | DeRosa |
| 2018/0171626 A1 | 6/2018 | Shi et al. |
| 2018/0347182 A1* | 12/2018 | Hawk ....................... E04B 1/86 |
| 2019/0338516 A1 | 11/2019 | Ray et al. |

OTHER PUBLICATIONS

Soroka et al. "Interrelation of Hardness, Modulus of Elasticity, and Porosity in Various Gypsum Systems", Journal of the American Ceramic Society, vol. 51, No. 6, (1968); pp. 337-340.*
International Search Report and Written Opinion in PCT/US2020/016038, dated Jun. 2, 2020.

* cited by examiner

ASYMMETRICAL LAMINATE PANEL AND METHOD OF MANUFACTURE

BACKGROUND OF THE DISCLOSURE

1. Field of the Disclosure

The present disclosure relates generally to plaster wall panels and methods for making plaster wall panels. The present disclosure relates more particularly to plaster wall panels having an asymmetrical laminate construction including a damping layer.

2. Technical Background

Plaster panels, often called "sheet rock" or "drywall", are typically used to construct walls within homes, businesses, or other buildings. Plaster panels are very often made of gypsum, but other materials, including lime and cement, are also used. A typical method for making a plaster wall panel involves dispensing and spreading a plaster material (e.g., a slurry of gypsum in water) onto a paper sheet or fiberglass mat on a platform, and covering the plaster material with another paper sheet or fiberglass mat. This sandwiched structure is fed through rollers to provide a structure of a desired thickness, then allowed to cure to form a hardened plaster material disposed between the two sheets of paper or fiberglass. The plaster wall panel may be cut into sections having predetermined lengths and widths that conform to accepted construction standards.

Soundproofing is becoming an ever-increasing concern for the construction industry, for example, for use in residences, hotels, schools, and hospitals. Soundproofing is also desirable in the construction of theaters and music studios, to insulate noise made in those areas from surrounding rooms. Model building codes and design guidelines often specify minimum Sound Transmission Class values for wall structures within buildings. While a number of construction techniques have been used to address the problem of soundproofing, one especially desirable technique uses sound-damping plaster wall panels that can be used in place of conventional drywall boards in various residential or commercial structures.

A sound-damping panel typically includes a damping sheet having viscoelastic properties disposed between two layers of hardened plaster material. Some methods for making a sound-damping panel include a "two-step" process of forming a plaster wall panel as described above, slicing the plaster panel in half through its thickness, then bonding the exposed plaster surfaces together with an adhesive that cures into a viscoelastic polymer. While this process can leverage existing plaster panel manufacturing processes, it is disadvantageous in at least two ways. First, it involves cutting the plaster wall panel, which is not only time consuming and messy, but can also structurally weaken the plaster material. Second, it involves a separate process of laminating the two plaster panel sections together with the viscoelastic material, which can create product defects such as misalignment of the two sections and delamination, if the viscoelastic material does not have sufficient adhesion strength.

Accordingly, what are needed are laminated sound-damping plaster wall panels that have excellent sound-damping characteristics but can be manufactured more easily, and a method to make such plaster wall panels.

SUMMARY OF THE DISCLOSURE

In one aspect, the present disclosure provides a plaster wall panel comprising:

a first plaster layer having a first thickness and being composed of a first plaster material having a first material property;

a second plaster layer having a second thickness and being composed of a second plaster material having a second material property, wherein the first thickness is smaller than the second thickness and wherein the first and second material properties are different; and a damping layer disposed between the first plaster layer and the second plaster layer.

In another aspect, the disclosure provides a method of forming a plaster wall panel according to the disclosure, the method comprising:

providing a first wet plaster precursor;
providing a second wet plaster precursor;
positioning a damping layer or a precursor therefor between the first wet plaster precursor and the second wet plaster precursor; and
drying the first and second wet plaster precursors such that the first plaster precursor hardens into the first plaster layer having the first thickness and the second plaster precursor hardens into the second plaster layer having the second thickness.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that conventional laminate wall panels are difficult to manufacture. The present inventors have determined that a modification of the material properties of the thinner layer of an asymmetrical wall panel can reduce the sound transmission through the panel.

Accordingly, one aspect of the disclosure is a plaster wall panel including a first plaster layer having a first thickness and being composed of a first plaster material having a first material property, and a second plaster layer having a second thickness and being composed of a second plaster material having a second material property. The first thickness is smaller than the second thickness, and the first and second material properties are different. The plaster wall panel also includes a damping layer disposed between the first plaster layer and the second plaster layer.

Figure 1:
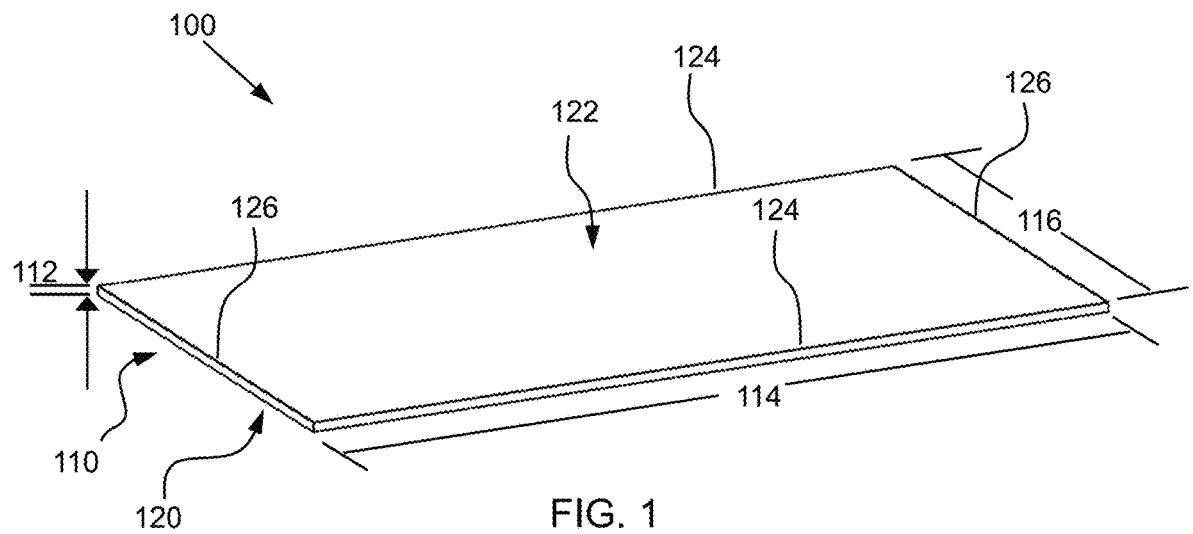
FIG. 1 is a schematic perspective view of a plaster wall panel according to an embodiment of the disclosure.
Figure 2:
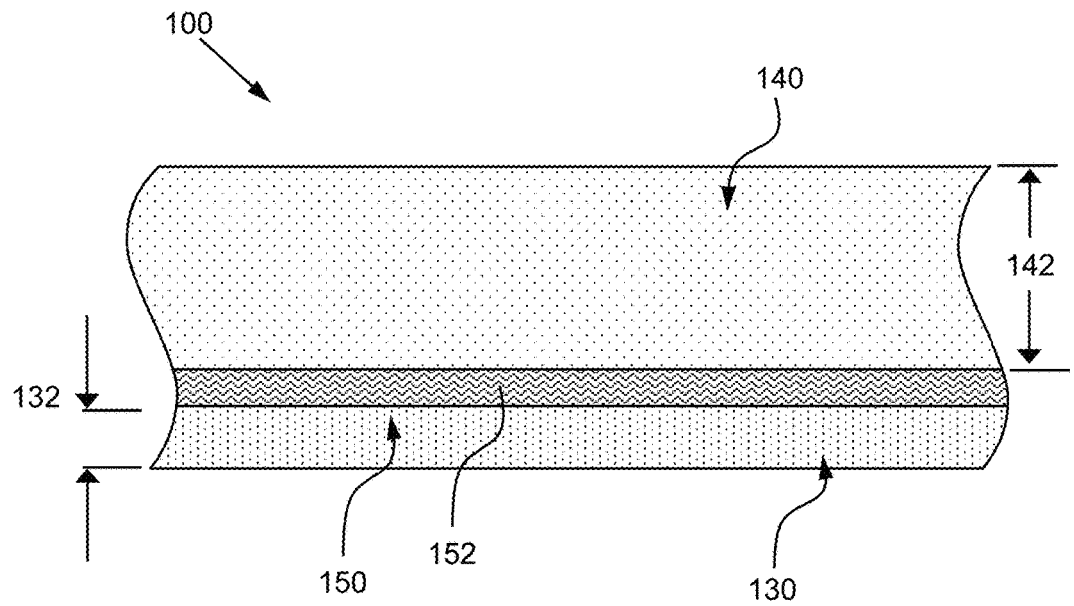
FIG. 2 is a schematic cross-sectional view of a portion of the plaster wall panel of FIG. 1.

Such a plaster wall panel is shown in perspective view in FIG. 1. Plaster wall panel 100 includes a substantially planar laminate structure 110 with layers stacked to form an overall thickness 112. Plaster wall panel 100 also has a length 114 and a breadth 116 and includes first and second surfaces 120, 122 that extend between opposing long edges 124 and short edges 126. The layers of laminate structure 110 are schematically depicted in FIG. 2. Plaster wall panel 100 includes a first plaster layer 130 having a first thickness 132 and a second plaster layer 140 having a second thickness 142. First plaster layer 130 is formed of a first plaster material and second plaster layer 140 is formed of a second plaster material, where the first and second plaster materials have at least one material property that is different. A damping layer 150 is disposed between the first plaster layer 130 and second plaster layer 140.

As the person of ordinary skill in the art will appreciate, the plaster layers described herein may be made using a variety of different inorganic base materials. For example, in certain embodiments of the plaster wall panels and methods as otherwise described herein, at least one of the first plaster material and second plaster material comprises a base material that is a gypsum material. In other words, one or both of the first and second plaster materials comprises a base material that is a gypsum material. In other embodiments of the plaster wall panels and methods as otherwise described herein, at least one of the first plaster material and second plaster material comprises a base material that is, for example, lime or cement. As described herein, the first and second plaster materials are hardened plaster materials, for example that have set from a slurry. In certain embodiments, the first and second plaster materials include respective base materials. Further, as will be appreciated by the person of ordinary skill in the art, the first and second plaster materials may include one or more fillers or additives in the base plaster material(s), e.g., fiberglass, a plasticizer material, a foaming agent, and/or ethylenediaminetetraacetic acid (EDTA).

In certain embodiments, the damping layer provides an acoustic layer, i.e., a layer that can provide the overall structure with reduced sound transmission (i.e., as compared to an otherwise identical plaster board lacking the acoustic layer). In particular, the damping layer can provide an increased damping loss to the overall structure (i.e., as compared to an otherwise identical plaster wall panel lacking the damping layer). While the detailed description of the present specification focuses primarily on viscoelastic polymer layers as an example, the person of ordinary skill in the art will appreciate that layers of other material can be present in the plaster wall panel. For example, a different type of acoustic layer can be used (i.e., instead of or in addition to a viscoelastic polymer), e.g., a layer that decouples vibrations in the first plaster layer from the second plaster layer, or vice versa.

In certain embodiments, the damping layer has a damping loss factor greater than 1%, e.g., greater than 2%, or greater than 3%, or greater than 5%, or greater than 10%, for example, in the range of 1%-50%, or 2%-50%, or 3%-50%, or 5%-50%, or 10%-50%, or 1%-40%, or 2%-40%, or 3%-40%, or 5%-40%, or 10%-40%, or 1%-30%, or 2%-30%, or 3%-30%, or 5%-30%, or 10%-30%. This can be compared with the much lower value, e.g., lower than 1% for typical plaster materials such as gypsum. As referred to herein, and as would be appreciated by the person of ordinary skill in the art, a "damping loss factor" is a dimensionless metric of how efficient a material is at dissipating mechanical vibrations (e.g., sound waves) as heat. In a laminated gypsum board, as in other laminated structures, the working mechanism for noise and vibration control is known as constrained layer damping (CLD). Energy dissipation in laminated gypsum boards is achieved by shearing the viscoelastic polymer between two layers of gypsum. The energy dissipation provided by the interlayer is quantified by the loss factor (q), a dimensionless quantity that can be measured directly or predicted from the modal damping of a dynamic system based on the RKU algorithm. Several standards are available for measuring the damping of a laminated structure (e.g., SAE J1737 or ISP 16940-2009); however, as used herein, ASTM E75-05 is used to measure the damping loss factor. Damping loss factor is further described in Crane, R. and Gillespie, J., "A Robust Testing Method for Determination of the Damping Loss Factor of Composites," Journal of Composites, Technology and Research, Vol. 14, No. 2, 1992, pp. 70-79; Kerwin et al., "Damping of Flexural Vibrations by means of Constrained Viscoelastic Laminate," Journal of Acoustic Society of America, 1959, pp. 952-962; and Ross, D. et al., "Damping of Flexural Vibrations by Means of Viscoelastic laminate", in Structural Damping, ASME, New York, 1959.

Figure 3:
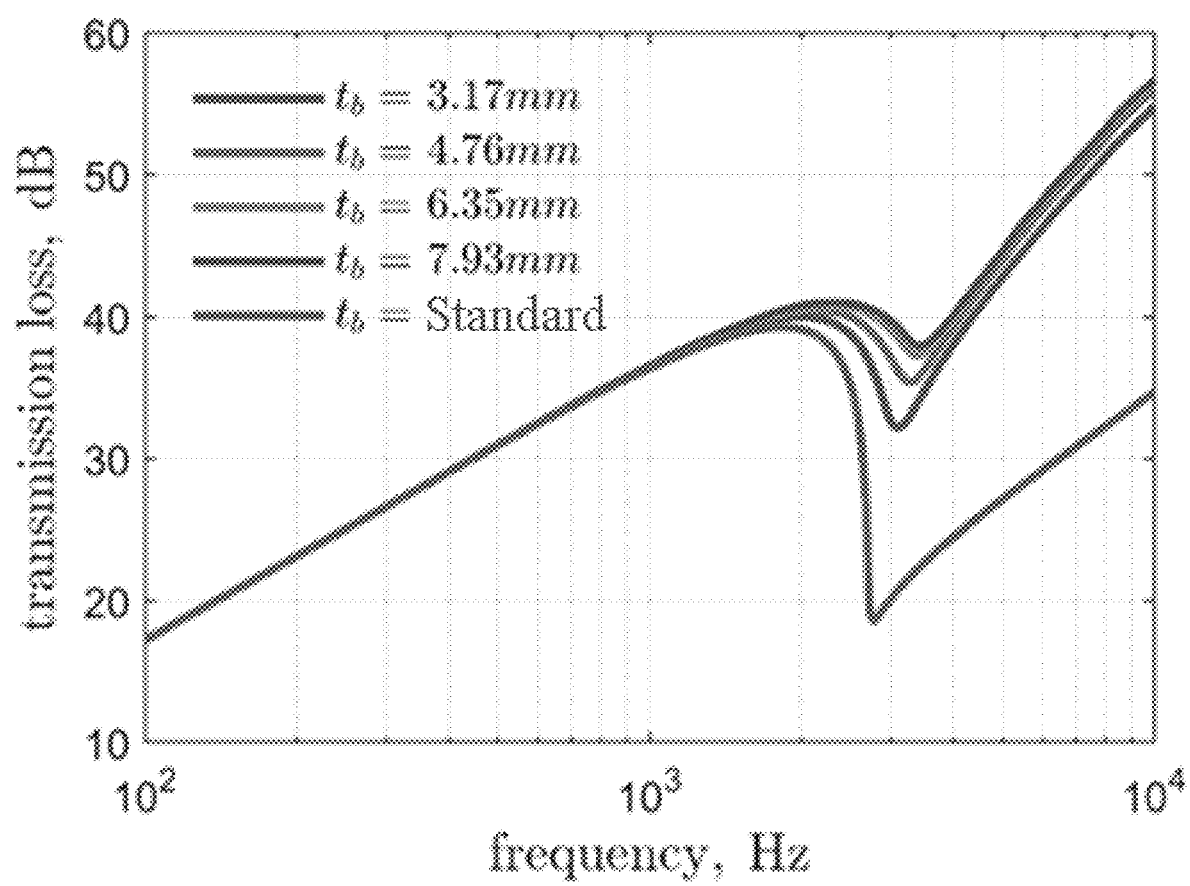
FIG. 3 is a set of transmission loss curves for panels having a range of bottom layer thicknesses, the order of traces, from top to bottom, at a frequency of $3 \times 10^3$ is 7.93 mm, 6.35 mm, 4.76 mm, 3.17 mm, and Standard.

In conventional laminate panels, where the damping layer is disposed between sections of a panel that has been cut into upper and lower sections, the transmission loss is greatest if the two sections have the same thickness. Any difference in the thickness between the two opposing sections reduces the transmission loss of the panel. The impact of the difference in thickness between the layers can be seen in FIG. 3, which shows transmission loss over a range of frequencies for several panels that have an overall thickness of 15.8 mm. Each of the laminate panels represented in FIG. 3 use the same material in both layers. In FIG. 3, the panel that shows the least transmission loss is a standard panel with only a single layer of plaster material and without any damping layer. In contrast, the panel that demonstrates the greatest transmission loss is the panel that has the damping layer disposed in the middle of the panel, such that the both layers are of equal thickness. The other lines in FIG. 3 represent other configurations where the overall thickness remains at 15.8 mm, but the thickness of one of the layers is reduced. Specifically, the data shows that a greater difference between the thickness of the layers results in lower transmission loss.

The present inventors have determined that the reduction in transmission loss that results from differences in thickness between the two layers of the panel is a consequence of the differences in the flexural rigidity (or bending stiffness) of the two layers. As used herein, ASTM C473-17 is used to measure flexural rigidity. The flexural rigidity of most structures decreases as the structure is made thinner, particularly if the same material is used. For example, a thick plate of steel has a much higher flexural rigidity than a thin plate of steel, which may be very flexible. Accordingly, in a conventional laminate panel, if the two layers of the panel are constructed at different thicknesses so that the panel is asymmetrical, the thinner layer has a smaller flexural rigidity than the thicker layer. This results in a reduced transmission loss of the panel, as a whole.

The present inventors have also determined that a reduction in transmission loss caused by the geometric asymmetry of the wall panel can be avoided by increasing the flexural rigidity of the thinner layer. In particular, in embodiments of the disclosure, at least one of the material properties of the first and second layers is different, so that the flexural rigidity of the thinner first layer can more closely match that of the thicker second layer. Specifically, in certain embodiments, the thinner first layer has material properties such that it has a higher flexural rigidity compared to a layer of the same thickness that is made with the same material properties of the second layer.

In certain embodiments as otherwise described herein, the first thickness is in a range from 3% to 75% of the second thickness, e.g., from 5% to 50%, e.g., from 5% to 10%, or from 10% to 20%, or from 20% to 30%, or from 30% to 40% or from 40% to 50%, e.g., 45% to 50%. The thickness of the each of the layers, as described herein, is measured in the direction that is perpendicular to the planar surface of the wall panel. The difference in thickness can allow the laminate wall panel structure to be fabricated more easily than if the first and second layers were of equal thickness.

In certain embodiments as otherwise described herein, the elastic modulus of the first plaster material is greater than the elastic modulus of the second plaster material. In certain embodiments, the elastic modulus of the first plaster material is in a range from 150% to 1000% of the elastic modulus of the second plaster material, e.g., from 150% to 200%, or from 200% to 300%, or from 300% to 400%, or from 400% to 500%, or from 500% to 600%, or from 600% to 700%, or from 700% to 800%, or from 800% to 900% or from 900% to 1000%. The elastic modulus of the material within a plaster layer has a significant impact on the flexural stiffness of the layer. In particular, a plaster layer composed of a material structure having a higher elastic modulus can regain some of the flexural rigidity that might be "lost" as a result of reducing the thickness of the layer. Thus, a layer with a lower thickness but a higher elastic modulus can have a similar flexural rigidity as a layer with a greater thickness but a lower elastic modulus.

In certain embodiments as otherwise described herein, the density of the first plaster material is greater than the density of the second plaster material. In certain embodiments, the density of the first plaster material is in a range from 110% to 400% of the density of the second plaster material, e.g., from 120% to 300%, e.g., from 120% to 150%, or from 150% to 200%, or from 200% to 250%, or from 250% to 300%. The density of a material can also impact the flexural rigidity of a structure made of that material. Likewise, variances in the density of a plaster material can vary the elastic modulus of a material, which will impact structures composed of the material, as explained above. Indeed, in some cases, the density of a plaster material can have a direct correlation with the elastic modulus. As will be appreciated by those of skill in the art, the density of the first and second plaster materials can be differentiated using different concentrations of foaming agents, fillers, or other additives. Likewise, one of the layers can include a foaming agent, filler or additive that is absent in the other to differentiate the density of the first and second plaster materials.

In certain embodiments as otherwise described herein, the first plaster material has a different composition than the second plaster material. For example, the first plaster material and second plaster material may include different fillers, binders, plasticizers or other agents that impact the flexural rigidity of the respective layer. These differences in the material composition can result in different densities, as described above, or they can result in materials with similar or the same density but that impact flexural rigidity in different ways. Accordingly, the composition of the first plaster material can be formulated to have a stronger influence on increasing the flexural rigidity of the first layer than the second plaster material has on the second layer. Thus, the difference in flexural rigidity between the two boards that would otherwise result from the difference in thicknesses can be reduced. In certain embodiments, the base material of the first plaster material and the second plaster material can be different.

For example, in certain embodiments as otherwise described herein, the first plaster material comprises a base material that is a gypsum material and the second plaster material comprises a base material that is lime or a cement. Likewise, in other embodiments, the first plaster material comprises a base material that is a lime or a cement and the second plaster material comprises a base material that is a gypsum material.

In certain embodiments as otherwise described herein, the first plaster material and second plaster material include a different concentration of additives that impact the flexural rigidity of the plaster layers, e.g., foaming agents, sodium trimetaphosphate, or polymer additives such as hydroxyethyl methyl cellulose, polyvinyl acetate and dextrin. For example, in some embodiments, the second layer includes a larger concentration of foaming agent. The higher concentration of foaming agent in the second layer results in a lower density of the second layer, which reduces its flexural rigidity. In some embodiments, the first layer includes sodium trimetaphosphate, which may increase the flexural rigidity of the first layer. Further, in some embodiments, the first layer includes polymer additives that add strength of the first layer so as to increase its structural rigidity.

In certain embodiments, the first layer (or both layers) includes reinforcing fibers to strengthen the respective layer. Suitable fibers include glass fibers or any of a range of organic fibers. In accordance with embodiments of the disclosure, these fibers can be used in the respective layers in ways that provide different material properties which impact the flexural rigidity of the layers themselves. For example, in certain embodiments as otherwise described herein, the first plaster layer includes a higher concentration of reinforcing fibers than the second plaster layer. In some embodiments, the first layer may include reinforcing fibers while the second layer is free of any reinforcing fibers.

In certain embodiments as otherwise described herein, the first material and second materials are anisotropic, and the orientation of the first material in the first plaster layer is different than the orientation of the second material in the second plaster layer. For example, in certain embodiments, reinforcing fibers are included in the layers, as described above, and the reinforcing fibers are arranged in a particular orientation. Further, in some embodiments, the orientation of the fibers in the first layer is different from the orientation of the fibers in the second layer. In other embodiments the material of the layers includes grains or other microstructures that form an anisotropic structure, and within the first and second plaster layers the orientation of these grains or microstructures is different.

As mentioned above, in certain embodiments as otherwise described herein, the damping layer is formed of a damping polymer. As the person of ordinary skill in the art will appreciate, a variety of materials can be used as the damping polymer, for example, a so-called "viscoelastic polymer." In various particular embodiments, the damping polymer is in the form of a glue, a resin, or an epoxy, for example.

In various embodiments of the plaster wall panels, the viscoelastic polymer is polyvinyl butyral, a silicone, or an acrylic. The viscoelastic polymer can be a thermally-cured material, e.g., a cured adhesive such as those available under the tradenames GreenGlue. Various viscoelastic glues made by Weber may also be suitable for use. Damping polymer compositions are also described in U.S. Pat. Nos. 8,028,800 and 9,157,241, each of which is hereby incorporated herein by reference in its entirety.

In certain embodiments, the damping polymer exhibits large stress/strain delay or phase difference under loading. These materials can be characterized by Dynamic-Mechanical Analysis (DMA), a technique commonly used to measure the mechanical and damping properties of polymer materials. The shear modulus (also known as the modulus of rigidity) is defined as the ratio of shear stress to shear strain; in certain particular embodiments as otherwise described herein, the damping polymer has a shear modulus in the range of 10 kPa to 100 MPa, e.g., 10 kPa-50 MPa, or 10 kPa-10 MPa, or 10 kPa-1 MPa, or 50 kPa to 100 MPa, or 50 kPa-50 MPa, or 50 kPa-10 MPa, or 50 kPa-1 MPa, or 100 kPa to 100 MPa, or 100 kPa-50 MPa, or 100 kPa-10 MPa, or 100 kPa-1 MPa. This can be compared to the elastic modulus of plaster materials (e.g., ~2 GPa for gypsum).

In certain embodiments of the plaster wall panel and methods as described herein, the damping layer is substantially less rigid than the hardened plaster material. For example, in certain embodiments, the damping layer is at least 20% less, or even at least about 40% less rigid or stiff than either of the first plaster layer or the second plaster layer. In some embodiments, the plaster wall panel is substantially less rigid (e.g., at least 20% less rigid or at least 40% less rigid) than an otherwise identical plaster wall panel lacking the damping layer.

In certain embodiments as otherwise described herein, the damping polymer includes or is filled with a fire resistant material (e.g., zinc borate) and/or a mold resistant material. Similarly, in some embodiments, one or both of first and second plaster layers include a fire resistant material and/or mold resistant materials. Further, in some embodiments, each of the first plaster layer, second plaster layer, and damping layer include such fire resistant material and/or mold resistant material.

The plaster wall panel according to the present disclosure can have a wide variety of different shapes and geometries. As set forth above, in some embodiments, the plaster wall panel is substantially planar. The phrase substantially planar, as used herein, refers to a panel that is significantly larger in length and breadth than in thickness. For example, the panel has a length and a width that is at least five times larger than the thickness of the panel, and in some cases the difference in these dimensions is significantly larger. It should be understood that a planar panel is planar in the sense of its general dimensions. Such a panel may have rough or textured surfaces and still be planar. In other embodiments, the panel may include a significant curve and not be planar.

The plaster wall panels of the present disclosure may be made in a variety of thicknesses. The person of ordinary skill in the art will select a desirable thickness for a particular end use. In certain embodiments of the plaster wall panels, the total thickness of the laminate structure is at least 5 mm and no more than about 50 mm. For example, in some embodiments, the thickness of the panel is in a range from 5 mm to 25 mm, or in a range from 6 mm to 20 mm. For example, in some embodiments, the thickness of the panel is about 6 mm, such as a ¼ inch panel. In other embodiments, the thickness of the panel is about 10 mm or about 13 mm, such as ⅜ inch or ½ panels. Still, in other embodiments the thickness of the panel is about 16 mm, such as ⅝ inch panels. Further still, in some particular embodiments the boards have a thickness of about 25 mm or 50 mm.

In certain embodiments as otherwise described herein, a length of the plaster wall panel is in a range from 6 feet to 24 feet, e.g., in a range from 8 feet to 20 feet, e.g., about 8 feet, about 9 feet, about 10 feet, about 12 feet, about 14 feet, about 16 feet, or about 20 feet. In certain embodiments as otherwise described herein, a width of the plaster wall panel is in a range from 24 inches to 96 inches, e.g., from 36 inches to 72 inches, e.g., about 48 inches or about 54 inches. Other lengths and widths are also possible.

In certain embodiments as otherwise described herein, the damping layer extends continuously across an entire length of the plaster wall panel. For example, in some embodiments, the material forming the damping layer extends from an edge of the wall panel at one end continuously to an opposing end at the opposite end of the panel.

In certain embodiments as otherwise described herein, the damping layer extends continuously across a portion of the width of the plaster wall panel from within 5 inches of a first long edge of the plaster wall panel to within 5 inches of a second long edge of the plaster wall panel. For example, in some embodiments, the material forming the damping layer extends across the majority of the width of the panel to within a certain short distance to the side edges, or long edges, of the panel. In some embodiments, the damping layer stops short of the edges, for example to accommodate a tapered edge of the panel. In other embodiments, the damping layer extends continuously across an entire width of the plaster wall panel.

In certain embodiments as otherwise described herein, the damping layer extends continuously across a portion of the length of the plaster wall panel from within 5 inches of a first short edge of the plaster wall panel to within 5 inches of a second short edge of the plaster wall panel. For example, in some embodiments, the material forming the damping layer extends across the majority of the length of the panel to within a certain short distance to the end edges, or short edges, of the panel. In some embodiments, the damping layer stops short of the short edges. In other embodiments, the damping layer extends continuously across an entire width of the plaster wall panel.

Still, in other embodiments, the material of the damping layer is segmented into sections between the first and second plaster layers. For example, in some embodiments, the damping layer is formed by a plurality of segmented sections of a damping material, such as a damping polymer, that are separated from one another. In some embodiments, the segmented sections are provided in a regular pattern, for example, as strips of the damping polymer, or in a checkerboard pattern. Such strips of damping polymer may extend along the length of the plaster wall panel, or across the width of the plaster wall panel. Other patterns are also possible, as will be appreciated by those of ordinary skill in the art.

In certain embodiments as otherwise described herein, the damping layer has a first surface that contacts the first plaster layer and a second surface that contacts the second plaster layer. In other words, in some embodiments, no layers other than the damping layer are provided between the first plaster layer and the second plaster layer. In particular, in such embodiments, the damping layer is in contact with the first plaster material of the first plaster layer and in contact with the second plaster layer of the second plaster material, without any additional layers or materials between the damping layer and the respective plaster material of the first or second layers.

In certain embodiments as otherwise described herein, the damping layer includes a damping polymer that extends from the first surface to the second surface and contacts the first plaster layer and the second plaster layer. In other words, in certain embodiments the damping layer includes a damping polymer without any additional layers, and the damping polymer extends from first plaster layer to the second plaster layer without any additional layers between the first and second plaster layers. In particular, in these embodiments, the damping polymer contacts both the first plaster material of the first plaster layer and the second plaster material of the second plaster layer without any layers other than that of the damping polymer between the first and second plaster layers. For example, plaster wall panel 100, shown in FIG. 1, includes such a damping layer. Specifically, damping layer 150 includes a damping polymer 152 that extends from first plaster layer 130 to second plaster layer 140.

In other embodiments, the damping layer includes a damping polymer disposed on a carrier sheet. Such a damping layer can be made by applying a precursor of the damping polymer on a carrier sheet, disposing the precursor-coated carrier sheet between plaster layers, and allowing the precursor to cure while between the first and second plaster layers (e.g., as the first and second plaster materials dry). Alternatively a pre-formed carrier sheet with the damping polymer disposed thereon can be disposed between the first and second plaster layers, which are then allowed to dry.

The carrier sheet can be formed from a variety of materials, e.g., sheet materials that are capable of carrying a damping polymer. For example, in certain embodiments of the plaster wall panel and methods as described herein, the carrier sheet comprises (or is) a paper sheet. In other embodiments of the plaster wall panel and methods as described herein, the carrier sheet comprises (or is) a fiberglass mat or a fiberglass fabric. In other embodiments of the plaster wall panel and methods as described herein, the carrier sheet comprises (or is) a woven or non-woven fabric, such as a felt. In other embodiments of the plaster wall panel and methods as described herein, the carrier sheet comprises (or is) a sheet of foamed polymer, e.g., the foamed polymer sheet sold by BASF under the trade name BASOTECT. In other embodiments of the plaster wall panel and methods as described herein, the carrier sheet comprises (or is) a polymer sheet, e.g., a thin polymer sheet of the type typically used as a plastic release liner for an adhesive, which can be, for example in the range of 0.001-0.002" thick. In other embodiments, the carrier sheet can be an adhesive sheet, e.g., with adhesive such as a pressure-sensitive adhesive presented at one or both surfaces thereof. Such pressure-sensitive adhesive sheets can be formed from a core sheet (made, e.g., from PVC or PET) with adhesive (e.g., a silicone pressure-sensitive adhesive or a polyacrylate adhesive) disposed on both sides thereof. Any release liners can be removed before use The damping polymer can be disposed on the carrier sheet in variety of manners. For example, in certain embodiments of the plaster wall panel and methods as described herein, the damping polymer is impregnated on the carrier sheet (e.g., when the carrier sheet has some level of porosity). In certain embodiments, the damping polymer is formed as a layer on one or both sides of the carrier sheet. The damping polymer can, for example, be impregnated into the pores of the carrier sheet and form layers on either side of the carrier sheet.

Figure 4:
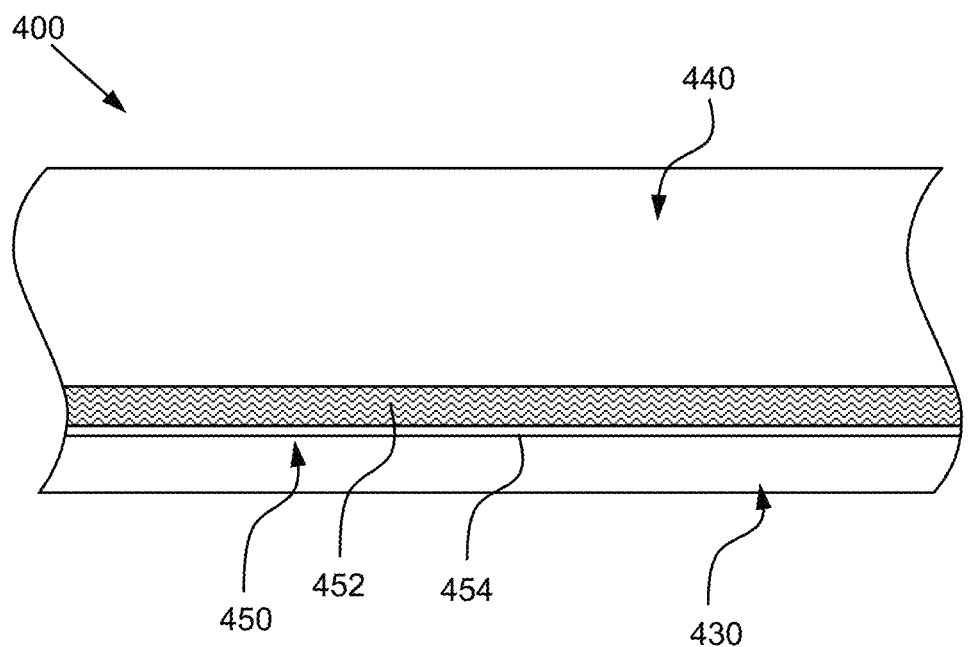
FIG. 4 is a schematic cross-sectional view of a portion of a plaster wall panel according to another embodiment of the disclosure.

In certain embodiments as otherwise described herein, where the damping layer includes a damping polymer on a carrier sheet, the damping polymer contacts one of the first plaster layer or second plaster layer, and the carrier sheet contacts the other of the first plaster layer or second plaster layer. In particular, in such embodiments, the carrier sheet and damping polymer components of the damping layer directly contact the plaster material of the respective plaster layers. A plaster wall panel including such a damping layer is shown in FIG. 4. Plaster wall panel 400 includes a first plaster layer 430 and a second plaster layer 440 with a damping layer 450 disposed therebetween. Damping layer 450 includes a sublayer of damping polymer 452 disposed on a damping sheet 454. The damping sheet 454 is disposed on and contacts first layer 430, while damping polymer 454 contacts second plaster layer 440.

In other embodiments, additional layers are included between the first and second plaster layers, as will be appreciated by those of ordinary skill in the art.

Figure 5:
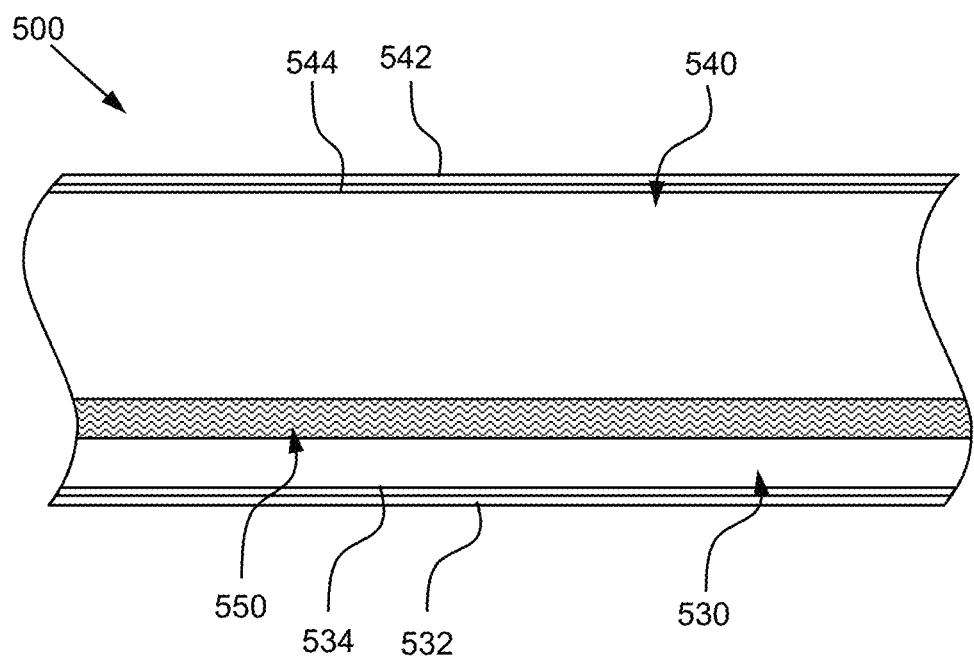
FIG. 5 is a schematic cross-sectional view of a portion of a plaster wall panel according to another embodiment of the disclosure.

In certain embodiments as otherwise described herein, the plaster wall panel includes a first facing sheet covering an outer surface of the first plaster layer. The first facing sheet may be formed from a variety of different materials, as will be appreciated by those of ordinary skill in the art, including materials similar to the carrier facing described above. For example, the facing sheet may be a paper facing or may include a fiber mat. Further, the facing sheet may be embedded with a polymer or plaster material. In certain embodiments, the first facing sheet has an exposed outer surface. In other words, in some embodiments, the first facing sheet is the outermost layer of the wall panel and no additional layers are disposed thereon. Such a plaster wall panel is shown in FIG. 5. Plaster wall panel 500 includes a first plaster layer 530 and a second plaster layer 540 with a damping layer 550 disposed therebetween. A first facing sheet 532 is disposed on first layer 530 and has an exposed outer surface.

In certain embodiments as otherwise described herein, the first facing sheet contacts the first plaster material at the outer surface of the first plaster layer. In other words, in some embodiments, there are no layers between the facing sheet and the first plaster material that makes up the first plaster layer. In other embodiments as otherwise described herein, the plaster wall panel includes a thin layer of dense plaster disposed between and in contact with the first facing sheet and the first plaster layer. In some embodiments, the thin layer of dense plaster has a thickness of less than 1.5 millimeters, e.g., a thickness in a range of about 500 micrometers to about 1 millimeter, and a density that is greater than the first plaster material. Plaster wall panel 500, shown in FIG. 5, includes a thin layer of dense plaster 534 between the first facing sheet 532 and the first plaster layer 530.

In certain embodiments as otherwise described herein, the plaster wall panel includes a second facing sheet covering an outer surface of the second plaster layer. As described above with respect to the first facing sheet, the second facing sheet may also be formed from a variety of different materials. In certain embodiments, the second facing sheet has an exposed outer surface. In other words, in some embodiments, the second facing sheet is the outermost layer of the wall panel and no additional layers are disposed thereon. For example, plaster wall panel 500 includes a second facing sheet 542 disposed on second layer 540 and has an exposed outer surface.

In certain embodiments as otherwise described herein, the second facing sheet contacts the second plaster material at the outer surface of the second plaster layer. In other embodiments as otherwise described herein, the plaster wall panel includes a thin layer of dense plaster disposed between and in contact with the second facing sheet and the second plaster layer. In some embodiments, the thin layer of dense plaster has a thickness of less than 1.5 millimeters, e.g., a thickness in a range of about 500 micrometers to about 1 millimeter, and a density that is greater than the second plaster material. For example, plaster wall panel 500 includes a thin layer of dense plaster 544 between the second facing sheet 542 and the second plaster layer 540.

In some embodiments, the thin layer of dense plaster between the second plaster layer and the second facing sheet has the same density as the first plaster layer. In such cases, in some embodiments, the thin layer of dense plaster is included between the second plaster layer and second facing sheet, but not between the first plaster layer and first facing sheet.

Figure 8:
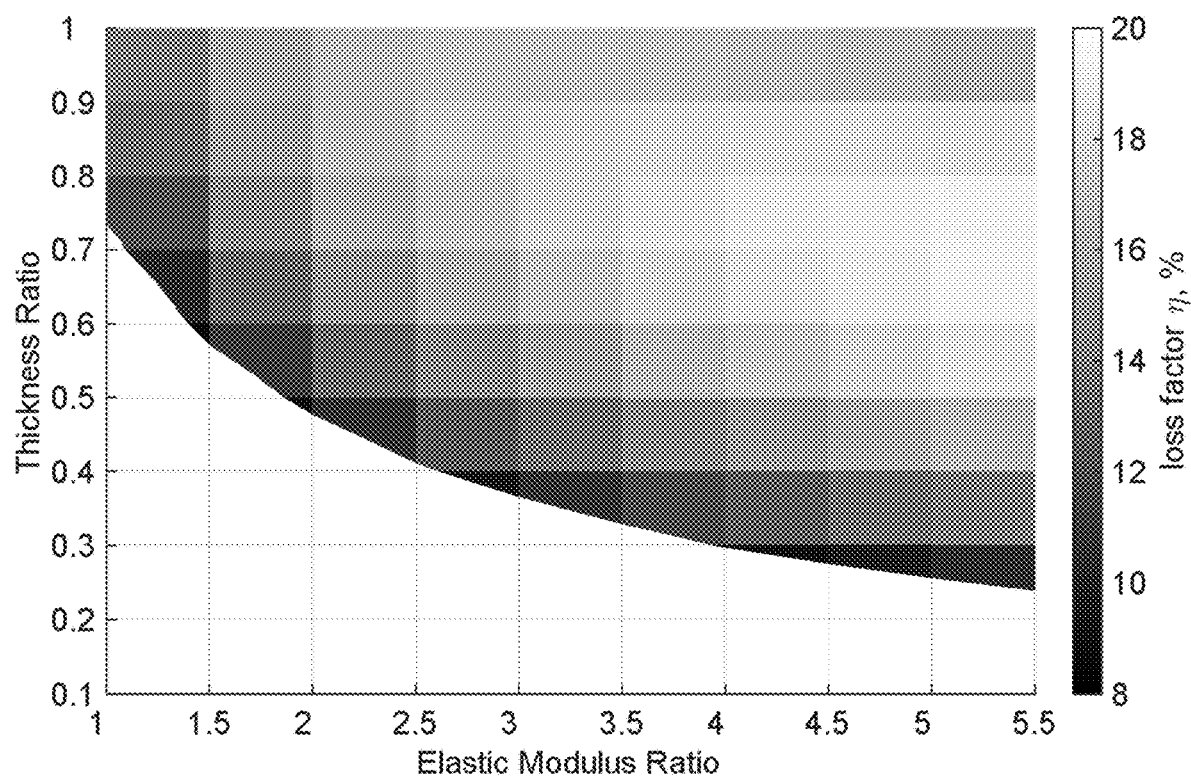
FIG. 8 is a graph showing a relationship between the ratio of the thickness of the first and second layers and the ratio of the elastic modulus of the first and second materials

In certain embodiments as otherwise described herein, the plaster wall panel has a damping loss factor that is at least 75% of the damping loss factor of a symmetrical plaster wall panel of the same overall thickness where both layers are formed of the second plaster material, e.g., at least 80% of the damping loss factor of the symmetrical plaster wall panel, e.g., at least 90% of the damping loss factor of the symmetrical plaster wall panel. For example, in some embodiments, the first material is selected such that an asymmetrical position of the damping layer reduces the damping loss factor of the plaster wall panel by no more than 25%, e.g., no more than 20%, e.g., no more than 10%. For example, in one embodiment, a plaster wall panel with a thickness of 16.2 mm has the damping layer offset from the center such that the thickness ratio of the first layer is 0.6, where the thickness ratio is defined as the ratio of the thickness of the first layer to half the overall thickness of the panel. In other words, in this embodiment, the first layer has a thickness of ~5 mm and the second layer has a thickness of ~11 mm. But the elastic modulus of the first layer is nearly 1.5× that of the second layer, such that the damping loss factor is roughly equivalent to a plaster wall panel of 16.2 mm, where the layers are symmetrical and are both formed of the second material. (This example is shown in FIG. 8 and described in more detail below.)

Another aspect of the disclosure is a method for making a plaster wall panel as described herein, the method including providing a first wet plaster precursor, providing a second wet plaster precursor, positioning a damping layer or a precursor therefor between the first wet plaster precursor and the second wet plaster precursor. The method further includes drying the first and second wet plaster precursors such that the first plaster precursor hardens into the first plaster layer having the first thickness and the second plaster precursor hardens into the second plaster layer having the second thickness. Such methods can be made using processes familiar to the person of ordinary skill in the art, using standard procedures and equipment for making, e.g., gypsum wallboards.

Figure 6:
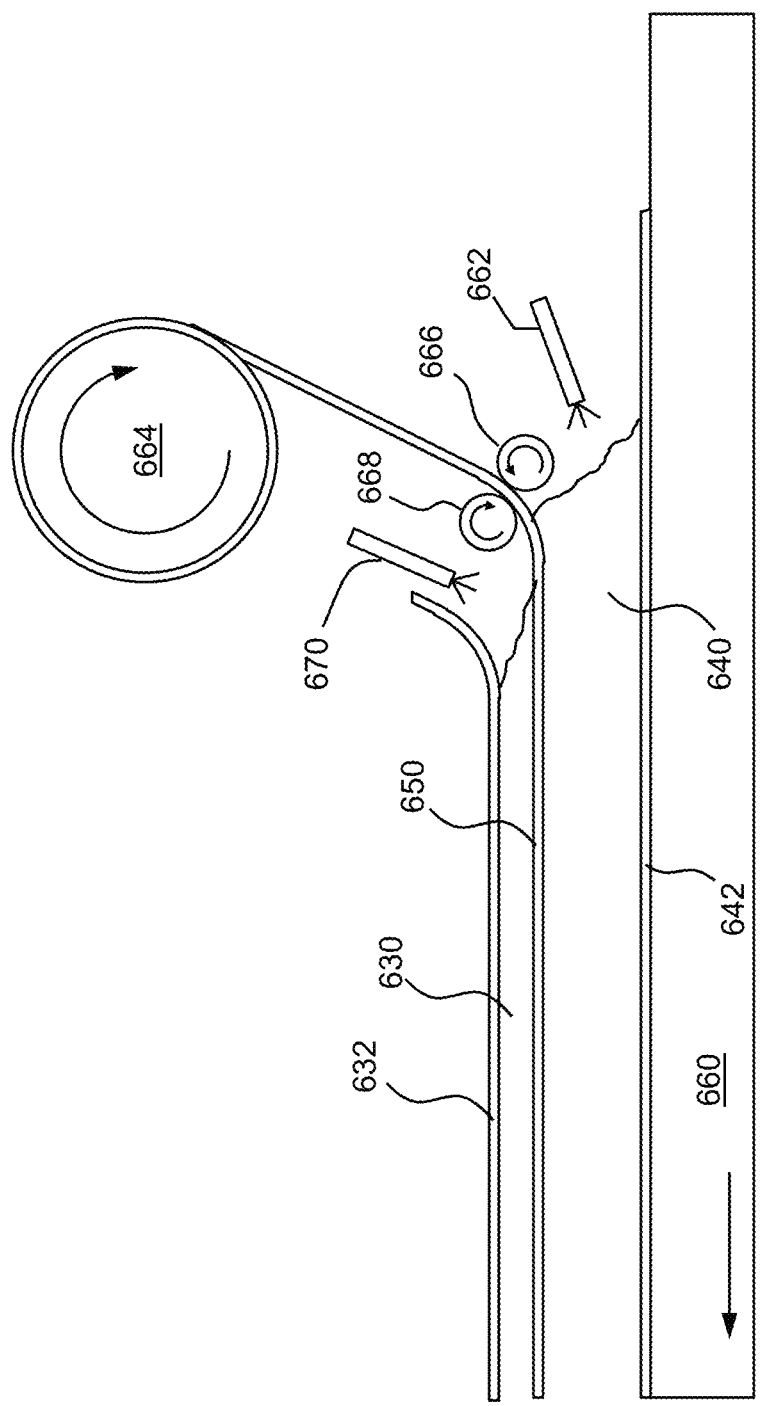
FIG. 6 is a schematic side view of an apparatus used in a method of forming a wall panel according to an embodiment of the disclosure.

FIG. 6 schematically depicts an apparatus for forming a plaster wall panel according to a method of the disclosure. The process can, for example, be completed using an in-line process. For example, in the embodiment of FIG. 6, a facing sheet of paper 642 is disposed on a platform 660 (here, a conveyer travelling from right to left as indicated by the arrow). A second layer of wet plaster precursor 640 is dispensed on the facing sheet 642 (i.e., on the platform 660) via dispenser 662. The wet plaster precursor can be, e.g., a slurry of gypsum, or another slurry, and can be of a viscosity that is typically used in the formation of plaster panels. A damping precursor layer 650 is disposed on top of the second layer of wet plaster precursor 640, for example, by being unrolled from a spool 664 (or multiple spools respectively corresponding to multiple precursor sheets). The position of rollers 666 and 668 may be adjustable to guide the damping precursor layer 650 into a desired position (e.g., height) with respect to the platform. The dispenser 670 is used to dispense the first layer of wet plaster precursor 630 on the damping precursor layer 650. Finally, another facing sheet of paper 632 is disposed on the first layer of wet plaster material 630. Thus, the wet plaster wall panel precursor 600 includes the first and second layers of wet plaster precursor 630, 640, with the damping precursor layer 650 spread out between the wet plaster precursor layers (i.e., between layers 640 and 630). The dispense ratio between the dispensers 662 and 670 can be used to control the thickness of the layers of wet plaster precursor and, ultimately, the first and second plaster layers. This process can be run continuously, like conventional gypsum wallboard manufacturing processes. The continuous sheet of plaster board can be divided as is conventional in the art, although extra care or processes may be necessary to cut the material of the damping layer.

The first and second wet plaster precursors are layers of wet plaster material that can be dried to provide first and second plaster layers as described above. For each layer, the wet plaster material is a wet, formable, plaster material that can harden to provide the hardened plaster material. The wet plaster material can be, for example, a gypsum slurry (i.e., when the hardened plaster material is a gypsum material). In other embodiments, the wet plaster material is a wet lime material or a wet cement material. But the person of ordinary skill in the art will appreciate that a variety of wet plaster materials can be used in the practice of the processes as described herein. The wet plaster material can include any additives or fillers familiar to the person of ordinary skill in the art, including those described above with respect to the hardened plaster material. The wet plaster material is desirably a semiliquid or otherwise formable mixture that can be, for example, dispensed and spread onto a surface such as a platform or conveyer.

In some embodiments, the damping precursor layer includes a carrier sheet as described above with respect to the plaster wall panel. The carrier sheet may have a damping polymer or a damping polymer precursor disposed on its surface or embedded in the sheet. In other embodiments, the damping precursor layer is a sheet of a damping polymer, e.g., without a carrier sheet. Such a material can be provided in roll form, or otherwise as will be appreciated by those of ordinary skill in the art. In certain embodiments, the polymer precursor material is a material that provides a viscoelastic polymer in the plaster wall panels of the disclosure. In some embodiments, the polymer precursor is a material that cures during the hardening of the plaster (e.g., to form a viscoelastic polymer as described above). Accordingly, a carrier sheet can be impregnated with a liquid or semiliquid thermally-curable formulation to be disposed between the wet plaster bodies. As the plaster of the layers hardens, the heat generated by the hardening can effectively cure the formulation into the viscoelastic polymer. Alternatively, in some embodiments, the polymer precursor material is a damping polymer (e.g., as described above) disposed on a carrier sheet, that is disposed between the wet plaster precursor layers, with the wet plaster material hardening against it. In certain such cases, the damping polymer is in a particulate or divided form, with the heat generated by the hardening of the plaster precursor layers being sufficient to soften the damping polymer to allow it to intimately contact the plaster layers upon hardening. In certain embodiments, the damping precursor sheet is prefabricated (e.g., in a separate process, or even offsite by a toll manufacturer).

In some embodiments, the damping polymer can be softened or even melted by the heat generated during the hardening of the plaster, to form a substantially continuous polymer material and to allow for intimate contact with the hardened plaster material.

In some embodiments, instead of applying the damping layer or a precursor thereof in sheet form (e.g., either as a carrier sheet with polymer material or precursor disposed thereon, or as a sheet of polymer material) a precursor for the damping layer is applied to the surface of the second layer of wet plaster material in liquid or semisolid form, e.g., by spraying or otherwise dispensing a layer of a polymer precursor thereon. A first layer of wet plaster material is then disposed on the damping layer. The polymer precursor can be cured before, after, or during the application of the first layer of wet plaster material. For example, the polymer precursor can be cured at least in part with the heat generated by the drying of the wet plaster material.

EXAMPLES

Laminate plaster wall panels as described herein can be modeled using principles of constrained layer damping, assuming a viscoelastic damping layer (having a thickness t, a density ρ, a shear modulus G* and a damping loss factor η) constrained between two layers of plaster (which need not be identical in properties, each having a thickness h, a density ρ, a Young's modulus E, and a damping loss factor η). The design principles for such a structure is described by the RKU model, described in D. Ross, E. E. Ungar and E. M. Kerwin, "Damping of plate flexural vibrations by means of viscoelastic laminate" Structural Damping, Section II ASME, 1959, which is hereby incorporated herein by reference in its entirety. Using such principles, various simulations were generated for an Easi-Lite board formulation with a base formula having a density of 540 kg/m³ and an approximate elastic modulus of 1.7 GPa. The simulations included an overall panel thickness of 15.8 mm, with a range of thicknesses used for the first plaster layer, or bottom layer, from 7.93 mm for the symmetrical default panel down to 1 mm for a very asymmetrical panel. Material properties of the simulated boards were also varied over a range of values. In particular, the elastic modulus of the first layer was varied from the default of 530 kg/m³ up to 1378 kg/m³. Based on the varied elastic modulus, corresponding densities were calculated using the density-elastic moduli relationship shown in equation (1):

$$E = \left(\frac{\rho}{\rho_s}\right)^2 E_s \quad (1)$$

where $E_S$ and $\rho_S$ denote the elastic modulus and density of unfoamed gypsum, respectively.

Figure 7:
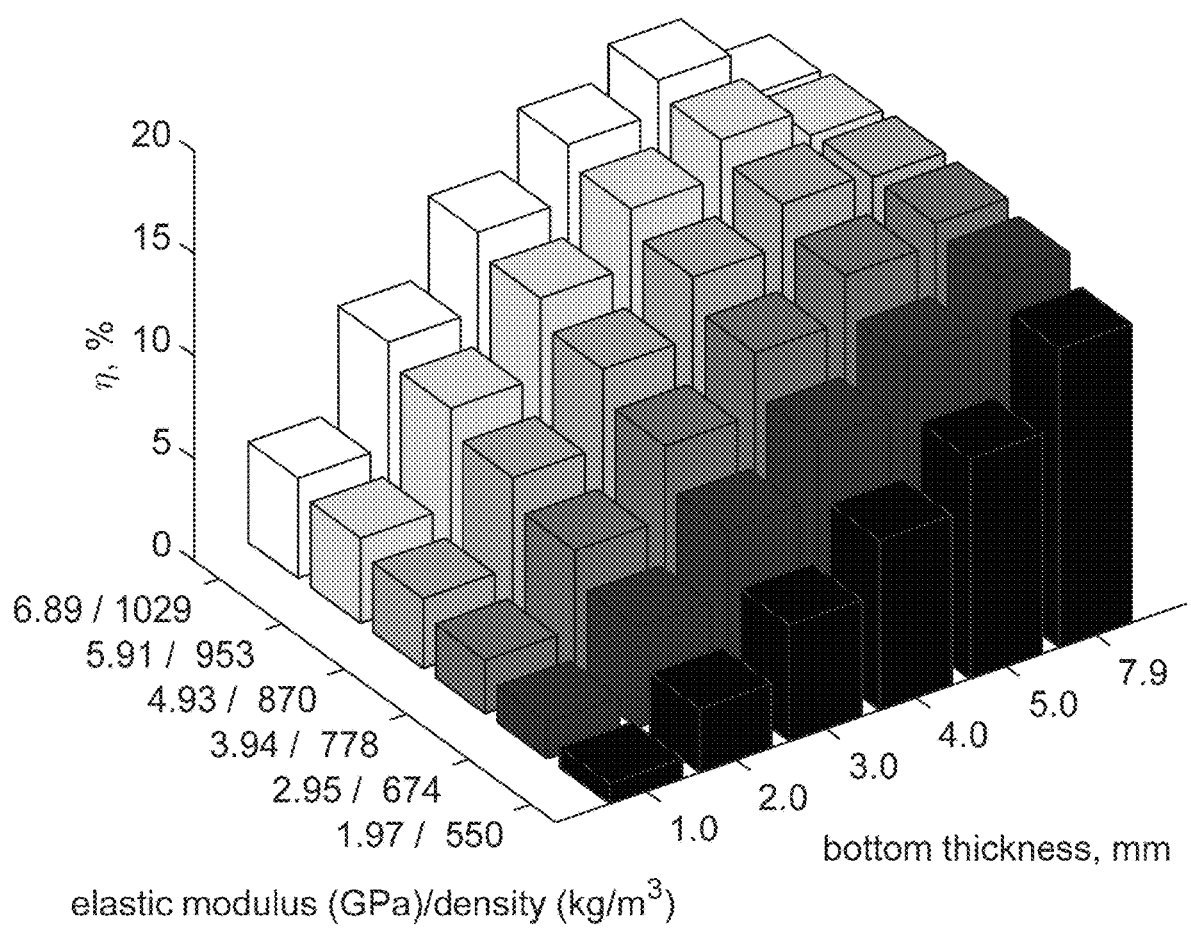
FIG. 7 is a graph showing the damping loss factor for wall panels with a range of layer thicknesses using materials of various density and elastic moduli.

The damping loss factor for the various wall panels is shown in FIG. 7. The data shows that although the damping loss factor drops substantially as the wall panel becomes more asymmetrical, the reduction in the damping loss factor can be substantially offset by varying the material properties of the first layer. In particular, FIG. 7 shows that an increase in both elastic modulus and density of the thinner, first layer yields gains in damping loss factor over a wide range of layer thicknesses and density, when the panel is asymmetrical. On the other hand, FIG. 7 also shows that asymmetry of the material properties can also reduce the damping loss factor for a geometrically asymmetrical board. Both of these findings support the conclusion that symmetry in the flexural stiffness between the two layers enhances the damping loss factor of the wall panel.

FIG. 8 illustrates the change in damping loss factor as a result of changes in thickness ratio and elastic modulus ratio, where the thickness ratio is defined as the thickness of the first layer over the half the thickness of the entire panel and the elastic modulus ratio is defined as the modulus of the first layer over the modulus of the bottom layer. FIG. 8 is based on simulations of a panel having a thickness of 16.2 mm, with a damping layer that is 0.3 mm thick. The simulations show the elastic modulus ratio between the first and second layers that is needed for various thickness ratios in order to yield a damping loss factor that is within 10% of the damping loss factor of a symmetrical board.

Figure 9:
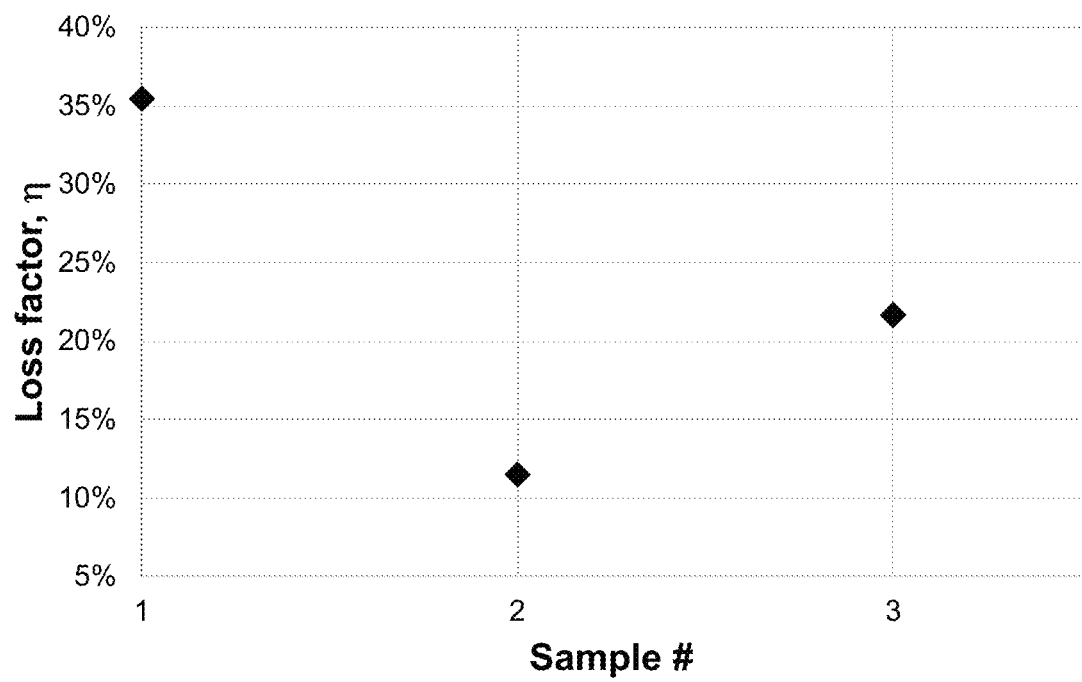
FIG. 9 is a graph showing the average damping loss factor of three samples of laminate structures.
Figure 10:
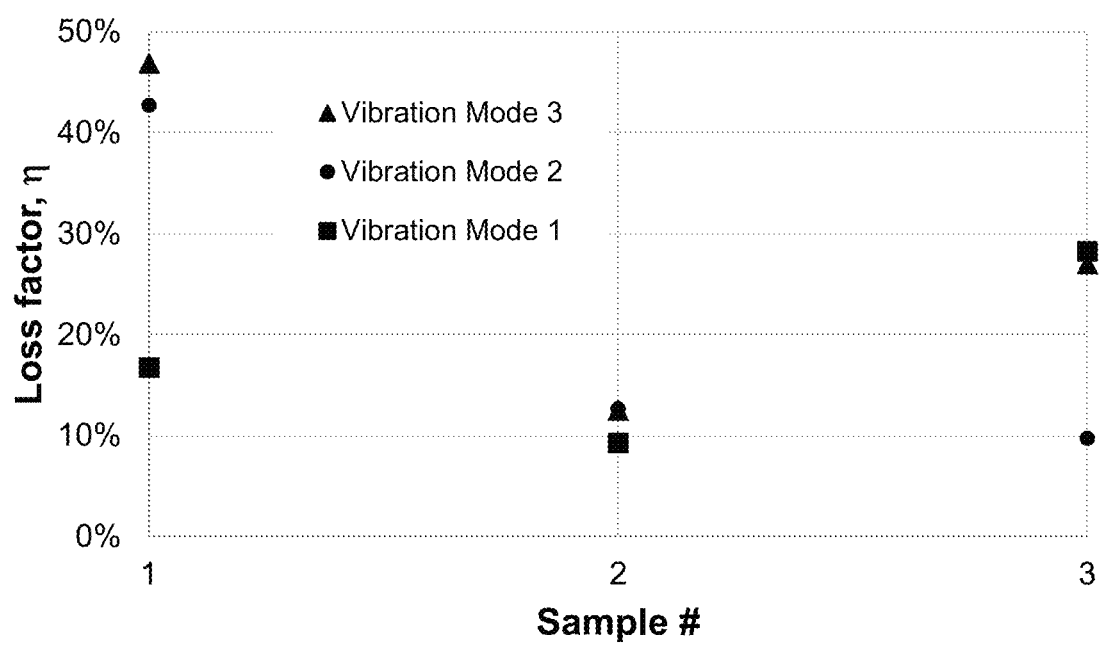
FIG. 10 is a graph showing the damping loss factor of three samples of laminate structures under different vibration modes.

FIG. 9 illustrates the average damping loss factor of three laminate structures. All three sample structures were formed of two layers separated by an interlayer of high damping BEH polymer (polyurethane foam+acrylic adhesive). Each of the samples had an overall thickness of 15.9 mm, a length of 600 mm, and a width of 25 mm. The first sample was symmetrical and formed of two ¼ inch layers of white Delrin® Acetal Resin Sheet, each having a bending stiffness of 1.5×10⁶ N/m. The second sample was asymmetrical and formed of a ⅜ inch layer of Delrin® Acetal Resin Sheet having a bending stiffness of 2.2×10⁶ N/m and a ⅛ inch layer Delrin® Acetal Resin Sheet having a bending stiffness of 7.5×10⁵ N/m. The third sample was also asymmetrical and formed of the ⅜ inch layer of Delrin® Acetal Resin Sheet and a ⅛ inch layer of Multipurpose 6061 aluminum sheet having a bending stiffness of 1.8×10⁷ N/m, The three samples were secured as cantilever beams and were vibrated according to the first three vibration modes of a fixed-free beam. FIG. 9 shows the average damping loss factor over all three vibration modes for each of the samples. While the asymmetrical second sample that included two layers of Acetal resin sheet had a substantially lower damping loss factor than the symmetrical first sample, the use of the stiffer aluminum layer in the third sample resulted in a higher damping loss factor than the similarly shaped second sample. Results of the damping loss factor for each individual vibration mode is shown in FIG. 10.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

EMBODIMENTS

Embodiment 1. A plaster wall panel comprising:
a first plaster layer having a first thickness and being composed of a first plaster material having a first material property;
a second plaster layer having a second thickness and being composed of a second plaster material having a second material property, wherein the first thickness is smaller than the second thickness and wherein the first and second material properties are different; and a damping layer disposed between the first plaster layer and the second plaster layer.

Embodiment 2. The plaster wall panel according to embodiment 1, wherein at least one of the first plaster material and second plaster material comprises a base material that is a gypsum material.

Embodiment 3. The plaster wall panel according to embodiment 1 or embodiment 2, wherein at least one of the first plaster material and second plaster material comprises a base material that is lime or a cement.

Embodiment 4. The plaster wall panel according to any of embodiments 1 to 3, wherein the first thickness is in a range from 3% to 75% of the second thickness, e.g., from 5% to 50%, e.g., from 5% to 10%, or from 10% to 20%, or from 20% to 30%, or from 30% to 40% or from 40% to 50%, e.g., 45% to 50%.

Embodiment 5. The plaster wall panel according to any of embodiments 1 to 4, wherein the elastic modulus of the first plaster material is greater than the elastic modulus of the second plaster material.

Embodiment 6. The plaster wall panel according to embodiment 5, wherein the elastic modulus of the first plaster material is in a range from 150% to 1000% of the elastic modulus of the second plaster material, e.g., from 150% to 200%, or from 200% to 300%, or from 300% to 400%, or from 400% to 500%, or from 500% to 600%, or from 600% to 700%, or from 700% to 800%, or from 800% to 900% or from 900% to 1000%.

Embodiment 7. The plaster wall panel according to any of embodiments 1 to 6, wherein the density of the first plaster material is greater than the density of the second plaster material.

Embodiment 8. The plaster wall panel according to embodiment 5, wherein the density of the first plaster material is in a range from 110% to 400% of the density of the second plaster material, e.g., from 120% to 300%, e.g., from 120% to 150%, or from 150% to 200%, or from 200% to 250%, or from 250% to 300%.

Embodiment 9. The plaster wall panel according to any of embodiments 1 to 8, wherein the first material has a different composition than the second material.

Embodiment 10. The plaster wall panel according to embodiment 9, wherein the first plaster material comprises a base material that is a gypsum material and the second plaster material comprises a base material that is lime or a cement.

Embodiment 11. The plaster wall panel according to embodiment 9, wherein the second plaster material comprises a base material that is a lime or a cement and the first plaster material comprises a base material that is a gypsum material.

Embodiment 12. The plaster wall panel according to any of embodiments 1 to 7, wherein the first plaster material and second plaster material include a different concentrations of additives that impact the flexural rigidity of the plaster layers, e.g., foaming agents, sodium trimetaphosphate, or polymer additives such as hydroxyethyl methyl cellulose, polyvinyl acetate and dextrin.

Embodiment 13. The plaster wall panel according to any of embodiments 1 to 12, wherein the first plaster layer includes a higher concentration of reinforcing fibers than the second plaster layer.

Embodiment 14. The plaster wall panel according to any of embodiments 1 to 10, wherein the first material and second materials are anisotropic, and wherein the orientation of the first material in the first plaster layer is different than the orientation of the second material in the second plaster layer.

Embodiment 15. The plaster wall panel according to any of embodiments 1 to 14, wherein the damping layer is formed of a damping polymer.

Embodiment 16. The plaster wall panel according to embodiment 15, wherein the damping polymer is a polyvinyl butyral.

Embodiment 17. The plaster wall panel according to embodiment 15, wherein the damping polymer is a silicone or an acrylic material.

Embodiment 18. The plaster wall panel according to any of embodiments 15 to 17, wherein the damping polymer has a shear modulus in the range of 10 kPa to 100 MPa.

Embodiment 19. The plaster wall panel according to any of embodiments 15 to 18, wherein the damping polymer comprises or is filled with a fire resistant material and/or a mold resistant material.

Embodiment 20. The plaster wall panel according to any of embodiments 1 to 19, wherein the damping loss factor for the damping layer is at least 5%.

Embodiment 21. The plaster wall panel according to any of embodiments 1 to 20, wherein the thickness of the plaster wall panel is at least 5 mm, e.g., in a range from 5 mm to 50 mm, e.g., in a range from 6 mm to 25 mm, e.g., in a range from 6 mm to 20 mm, e.g., about 6 mm, or about 10 mm, or about 13 mm, or about 16 mm.

Embodiment 22. The plaster wall panel according to any of embodiments 1 to 21, wherein a length of the plaster wall panel is in a range from 6 feet to 24 feet, e.g., in a range from 8 feet to 20 feet, e.g., about 8 feet, about 9 feet, about 10 feet, about 12 feet, about 14 feet, about 16 feet or about 20 feet.

Embodiment 23. The plaster wall panel according to any of embodiments 1 to 22, wherein a width of the plaster wall panel is in a range from 24 inches to 96 inches, e.g., from 36 inches to 72 inches, e.g., about 48 inches or about 54 inches.

Embodiment 24. The plaster wall panel according to any of embodiments 1 to 23, wherein a thickness of the damping layer is in a range of 0.05 mm to 4 mm, e.g., 0.2 mm to 2 mm, e.g., 0.3 mm to 1 mm.

Embodiment 25. The plaster wall panel according to any of embodiments 1 to 24, wherein the damping layer extends continuously across an entire length of the plaster wall panel.

Embodiment 26. The plaster wall panel according to any of embodiments 1 to 24, wherein the damping layer extends continuously across a portion of the width of the plaster wall panel from within 5 inches of a first long edge of the plaster wall panel to within 5 inches of a second long edge of the plaster wall panel.

Embodiment 27. The plaster wall panel according to any of embodiments 1 to 26, wherein the damping layer extends continuously across an entire width of the plaster wall panel.

Embodiment 28. The plaster wall panel according to any of embodiments 1 to 26, wherein the damping layer extends continuously across a portion of the length of the plaster wall panel from within 5 inches of a first short edge of the plaster wall panel to within 5 inches of a second short edge of the plaster wall panel.

Embodiment 29. The plaster wall panel according to any of embodiments 1 to 24, wherein the damping layer is segmented in a regular pattern, e.g., in strips or in a checkerboard pattern.

Embodiment 30. The plaster wall panel according to embodiment 29, wherein the regular pattern includes strips, and wherein the strips extend continuously across one of the width or the length of the plaster wall panel.

Embodiment 31. The plaster wall panel according to any of embodiments 1 to 30, wherein the damping layer has a first surface that contacts the first plaster layer and a second surface that contacts the second plaster layer.

Embodiment 32. The plaster wall panel according to embodiment 31, wherein the damping layer includes a damping polymer that extends from the first surface to the second surface and contacts the first plaster layer and the second plaster layer.

Embodiment 33. The plaster wall panel according to embodiment 31, wherein the damping layer includes a damping polymer disposed on a carrier sheet, e.g., of paper or fiber glass, and
  wherein the damping polymer contacts one of the first plaster layer or second plaster layer, and the carrier sheet contacts the other of the first plaster layer or second plaster layer.

Embodiment 34. The plaster wall panel according to any of embodiments 1 to 32, further comprising a first facing sheet covering an outer surface of the first plaster layer, wherein the first facing sheet has an exposed outer surface.

Embodiment 35. The plaster wall panel according to embodiment 34, wherein the first facing sheet contacts the first plaster material at the outer surface of the first plaster layer.

Embodiment 36. The plaster wall panel according to embodiment 34, further comprising a thin layer of dense plaster disposed between and in contact with the first facing sheet and the first plaster layer, wherein the thin layer of dense plaster has a thickness of less than 1.5 millimeters and a density that is greater than the first plaster material.

Embodiment 37. The plaster wall panel according to any of embodiments 1 to 36, further comprising a second facing sheet covering an outer surface of the second layer, wherein the second facing sheet has an exposed outer surface.

Embodiment 38. The plaster wall panel according to embodiment 37, wherein the second facing sheet contacts the second plaster material at the outer surface of the second plaster layer.

Embodiment 39. The plaster wall panel according to embodiment 37, further comprising a thin layer of dense plaster disposed between and in contact with the second facing sheet and the second plaster layer, wherein the thin layer of dense plaster has a thickness of less than 1.5 millimeters and a density that is greater than the second plaster material.

Embodiment 40. The plaster wall panel according to any of embodiments 1 to 39, wherein the plaster wall panel has a damping loss factor that is at least 75% of the damping loss factor of a symmetrical plaster wall panel of the same overall thickness where both layers are formed of the second plaster material, e.g., at least 80% of the damping loss factor of the symmetrical plaster wall panel, e.g., at least 90% of the damping loss factor of the symmetrical plaster wall panel.

Embodiment 41. A method of forming a plaster wall panel according to any of embodiments 1 to 40, the method comprising:
  providing a first wet plaster precursor;
  providing a second wet plaster precursor;
  positioning a damping layer or a precursor therefor between the first wet plaster precursor and the second wet plaster precursor; and
  drying the first and second wet plaster precursors such that the first plaster precursor hardens into the first plaster layer having the first thickness and the second plaster precursor hardens into the second plaster layer having the second thickness.

Embodiment 42. The method according to embodiment 41, wherein providing the second wet plaster precursor comprises dispensing the second wet plaster precursor onto a platform, such as a conveyor.

Embodiment 43. The method according to embodiment 41, where a facing sheet is disposed on the platform, such that the second wet plaster precursor is disposed on the facing sheet.

Embodiment 44. The method according to any of embodiments 41 to 43, wherein positioning the damping layer or precursor therefor between the first wet plaster precursor and the second wet plaster precursor includes unrolling the damping layer or precursor therefor onto the second wet plaster precursor.

Embodiment 45. The method according to any of embodiments 41 to 44, wherein hardening of at least one of the first and second wet plaster precursor generates sufficient heat to soften a polymer precursor for the damping layer.

Embodiment 46. The method according to any of embodiments 41 to 45, wherein hardening of at least one of the first and second wet plaster precursor generates sufficient heat to cure a polymer precursor for the damping layer.

What is claimed is:

1. A plaster wall panel comprising:
  a first plaster layer having a first thickness and being composed of a first plaster material;
  a second plaster layer having a second thickness and being composed of a second plaster material having a second material property, wherein the first thickness is smaller than the second thickness, wherein the density of the first plaster material is greater than the density of the second plaster material, and wherein the elastic modulus of the first plaster material is in a range from 150% to 1000% of the elastic modulus of the second plaster material; and
  a damping layer disposed between the first plaster layer and the second plaster layer.

2. The plaster wall panel according to claim 1, wherein at least one of the first plaster material and second plaster material comprises a base material that is a gypsum material.

3. The plaster wall panel according to claim 1, wherein at least one of the first plaster material and second plaster material comprises a base material that is lime or a cement.

4. The plaster wall panel according to claim 1, wherein the first thickness is in a range from 3% to 75% of the second thickness.

5. The plaster wall panel according to claim 1, wherein the density of the first plaster material is in a range from 110% to 400% of the density of the second plaster material.

6. The plaster wall panel according to claim 1, wherein the first material has a different composition than the second material.

7. The plaster wall panel according to claim 6, wherein the first plaster material and second plaster material include different concentrations of additives that impact the flexural rigidity of the plaster layers.

8. The plaster wall panel according to claim 1, wherein the damping layer is formed of a damping polymer.

9. The plaster wall panel according to claim 8, wherein the damping polymer has a shear modulus in the range of 10 kPa to 100 MPa.

10. The plaster wall panel according to claim 8, wherein the damping polymer comprises or is filled with a fire resistant material and/or a mold resistant material.

11. The plaster wall panel according to claim 1, wherein the damping layer has a first surface that contacts the first plaster layer and a second surface that contacts the second plaster layer.

12. The plaster wall panel according to claim 11, wherein the damping layer includes a damping polymer that extends from the first surface to the second surface and contacts the first plaster layer and the second plaster layer.

13. The plaster wall panel according to claim 1, wherein the damping layer includes a damping polymer disposed on a carrier sheet, and
wherein the damping polymer contacts one of the first plaster layer or second plaster layer, and the carrier sheet contacts the other of the first plaster layer or second plaster layer.

14. The plaster wall panel according to claim 1, wherein the plaster wall panel has a damping loss factor that is at least 75% of the damping loss factor of a symmetrical plaster wall panel of the same overall thickness where both layers are formed of the second plaster material.

15. The plaster wall panel according to claim 1, wherein the first plaster layer includes a higher concentration of reinforcing fibers than the second plaster layer.

16. A method of forming a plaster wall panel according to claim 1, the method comprising:
providing a first wet plaster precursor;
providing a second wet plaster precursor;
positioning a damping layer or a precursor therefor between the first wet plaster precursor and the second wet plaster precursor; and
drying the first and second wet plaster precursors such that the first plaster precursor hardens into a first plaster layer having a first thickness and being composed of a first plaster material having a first material property and the second plaster precursor hardens into a second plaster layer having a second thickness and being composed of a second plaster material having a second material property,
wherein the first and second material properties are different.

17. The method according to claim 16, wherein providing the second wet plaster precursor comprises dispensing the second wet plaster precursor onto a platform, such as a conveyor.

18. The method according to claim 16, wherein positioning the damping layer or precursor therefor between the first wet plaster precursor and the second wet plaster precursor includes unrolling the damping layer or precursor therefor onto the second wet plaster precursor.

19. The method according to claim 16, wherein hardening of at least one of the first and second wet plaster precursor generates sufficient heat to soften a polymer precursor for the damping layer.

20. The method according to claim 16, wherein hardening of at least one of the first and second wet plaster precursor generates sufficient heat to cure a polymer precursor for the damping layer.

* * * * *